United States Patent Office 3,308,203
Patented Mar. 7, 1967

3,308,203
POLYSILOXANE BLOCK COPOLYMER RUBBER AND PROCESS FOR MAKING SAME
Virgil L. Metevia, Bay City, and Keith E. Polmanteer, Midland, Mich., assignors to Dow Corning Corporation, Midland, Mich., a corporation of Michigan
No Drawing. Filed June 24, 1964, Ser. No. 377,526
16 Claims. (Cl. 260—825)

This application is a continuation-in-part of copending application, Serial No. 210,235, filed July 16, 1962 now abandoned.

This invention relates to a new type of silicone rubber and the process for producing this rubber.

Although excellent silicone elastomers are now available, they are not as "snappy" or elastic as is desired for many uses. A measure of the elasticity or "snappiness" of a rubber is the difference between the amount of energy required to extend or stretch a sample of rubber and the amount recovered during relaxation of the sample, both at a constant rate. The lower this difference the more elastic the rubber. The snappiness of a rubber can also be measured by determining the complex dynamic shear modulus and breaking this down vectorially into two components, one in phase with the strain and the other 90° out of phase. The component in phase with strain (real modulus) is comparable to a helical spring, while the component out of phase (imaginary modulus) is comparable to a perfect damper. The larger the real modulus ($G'$) in relation to the imaginary modulus ($G''$), the closer the material approaches the characteristics of a helical steel spring. The rubber produced in accordance with this invention has a large $G'/G''$ ratio, and hence is very elastic. This rubber is more elastic than conventional silicone rubber.

The fatigue resistance of conventional silicone rubber has not been as great as desired. A rubber with a high fatigue resistance inherently possesses resistance against the generation of flaws upon repeated straining, and in addition requires only slightly less force to extend the sample on subsequent extensions than was required on the first extension. The elastomers of this invention have extremely good fatigue resistance.

Although silicone elastomers with good tensile strength have been developed, all of these elastomers contain some type of filler, e.g., a reinforcing silica filler. Prior to this invention, none of the commercial unfilled silicone elastomers possessed good tensile strengths. It is desirable to produce an unfilled silicone rubber with high tensile strength because there are certain uses where an unfilled rubber is preferred. The efficiency and economy of silicone rubber production would also be increased by the elimination of the production step where the filler is incorporated with the gum.

It is an object of this invention to produce a silicone rubber which has superior elastic properties. Another object is to produce a silicone rubber with improved fatigue resistance. It is a further object to develop an unfilled silicone rubber with excellent tensile strength. It is also an object to develop a more efficient and economical process to produce a siloxane block copolymer.

These objects are obtained by a process for preparing a siloxane block copolymer which comprises A. Mixing and heating in a suitable solvent at a temperature and for a time sufficient to produce a heat-curable siloxane block copolymer
  (1) 100 parts by weight of an organopolysiloxane which has an average of at least 200 silicon atoms per molecule, said siloxane consisting essentially of units of the formula $R_nSiO_{4-n/2}$, wherein R is selected from the group consisting of methyl, phenyl and vinyl radicals, $n$ has an average value of from 1.98 to 2.00 inclusive, there being an average of at least 0.75 methyl radical and an average of no more than 0.15 vinyl radical per silicon atom in said siloxane, no more than 50 mol percent of said siloxane being $(C_6H_5)_2SiO$ units, said siloxane having an average of at least 2 silicon-bonded hydroxyl radicals per molecule,
  (2) from 8 to 220 parts by weight of an organosilicon compound selected from the group consisting of
    (a) a siloxane represented by the unit formula $(C_6H_5)_xR'_ySiO_{4-x-y/2}$, wherein R' is a monovalent hydrocarbon radical, $x$ has an average value of from 0.65 to 1.3, $y$ has an average value of less than 0.4, the sum of $x+y$ is from 0.95 to 1.3 inclusive, at least 60 mol percent of said siloxane being $(C_6H_5)SiO_{1.5}$ units, said siloxane containing an average of at least 2 radicals per molecule which are selected from the group consisting of hydroxyl and —OM radicals wherein M is an alkali metal or a quaternary ammonium radical,
    (b) a silanol of the general formula

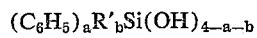

wherein R' is a monovalent hydrocarbon radical, $a$ has an average value of from 0.65 to 1.3, $b$ has an average value of less than 0.4 and the sum of $a+b$ is from 1 to 1.3 inclusive and at least 60 mol percent of said silanol being of the formula $(C_6H_5)Si(OH)_3$,
  (3) a catalytic amount of a silicon-bonded hydroxyl condensation catalyst,
  the concentration of solids in the solvent being such that no appreciable gelation occurs during the heating step,
(B) and removing the solvent from the reaction product obtained in step (A), there being sufficient agitation during the step to keep the product substantially homogeneous.

The compositions prepared by the process of this invention are copolymers characterized by the fact that the two principal ingredients are preformed and then linked together under conditions which do not cause excessive siloxane bond rearrangement in (1). Thus, these compositions are essentially block copolymers in which blocks or segments of $R_nSiO_{4-n/2}$ units are coupled to (2) (i.e., either the phenyl siloxane or phenylsilanol). One of the critical features is that the blocks or segments of $R_nSiO_{4-n/2}$ must average at least 200 silicon atoms per block. Thus, when (1) is a dimethylsiloxane, the blocks have the formula

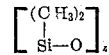

wherein $z$ has a value of at least 200. A representative formula therefore of the block copolymers would be $[R_nSiO_{4-n/2}]_z[(C_6H_5)_xR'_ySiO_{4-x-y}]_m$ in which $z$ is at least 200 and $m$ is an integer and R, R', $n$, $x$ and $y$ are as above defined.

It can be seen that the copolymers of this invention are different from cohydrolyzates prepared by cohydrolyzing and cocondensing methylsilanes and phenylsilanes. Such copolymers have completely random structures which do not have the properties of the block copolymers of this invention.

One of the essential reactants of this process is (1) an organosiloxane of the unit formula $R_nSiO_{4-n/2}$, wherein R is selected from the group consisting of methyl, phenyl and vinyl radicals. It is essential that there is an average of at least 0.75 methyl radical per silicon atom and an average of no more than 0.15 vinyl radical per silicon atom in this siloxane. Preferably all of the R groups are methyl. The operative siloxanes (1) are essentially diorganosiloxanes and the subscript $n$ has an average value of from 1.98 to 2.00 inclusive. It is essential that siloxane (1) contain no more than 50 mol percent $(C_6H_5)_2SiO$ units, and siloxane (1) has an average of at least two hydroxyl radicals per molecule. It should be understood that siloxane (1) can also contain some residual reactive groups such as alkoxy radicals which are often present in siloxanes. Such reactive groups can condense with SiOH or SiOM groups in (2) or they can react with water to generate SiOH groups in siloxane (1) in situ. Examples of such alkoxy radicals are methoxy, ethoxy, isopropoxy and butoxy radicals. It is preferred that all of these radicals be hydroxy radicals. Although this siloxane can contain more than two of these radicals, it is preferred that the siloxane contain an average of two hydroxyl radicals per molecule.

It is essential that siloxane (1) have an average of at least 200 silicon atoms per molecule. It is preferred that siloxane (1) have an average of from 300 to 3500 silicon atoms per molecule. The best results are obtained with a hydroxyl-endblocked dimethylsiloxane having an average of from 300 to 3500 silicon atoms per molecule. The hydroxyl-endblocked dimethylsiloxanes which contain from 5 to 10 mol percent $(C_6H_5)(CH_3)SiO$ units and a small amount of methylvinylsiloxane units (less than 5 mol percent) yield elastomers with excellent low temperature properties.

The above defined siloxane (1) is reacted with either a phenyl-containing siloxane or a phenyl-containing silanol. The phenyl-containing siloxane is preferred. The phenyl-containing siloxane is of the unit formula $(C_6H_5)_xR'_ySiO_{4-x-y/2}$, wherein R' is a monovalent hydrocarbon radical. Specific examples of monovalent hydrocarbon radicals which are operative in this invention are alkyl groups, such as methyl, ethyl, tert-butyl and octadecyl; alkenyl groups such as vinyl, allyl and butadienyl; cycloalkyl groups such as cyclobutyl, cyclopentyl and cyclohexyl; cycloalkenyl groups such as cyclopentenyl and cyclohexenyl; aryl groups such as xenyl; aralkyl groups such as benzyl and xylyl; and alkaryl groups such as tolyl. Thus, the phenyl-containing siloxane can contain only phenyl substituents in which case $x$ has a value of from 0.95 to 1.3 or this siloxane can contain phenyl substituents plus other monovalent hydrocarbon radicals. The latter are present in amount less than 0.4 such radical per silicon atom. At least 60 mol percent of the phenyl-containing siloxane are $(C_6H_5)SiO_{1.5}$ units, while the remainder can be $SiO_2$ units and such units as $R'SiO_{1.5}$, $R'_2SiO$ and $(C_6H_5)R'SiO$. In all cases the ratio of organic groups to silicon in this siloxane must fall within the above range.

It is preferred that R' is an aliphatic hydrocarbon radical of from 1 to 6 inclusive carbon atoms. Preferably R' is vinyl. Preferably the phenyl-containing siloxane has an average of from 0.9 to 1.2 inclusive phenyl radicals per silicon atom with $y$ having a value of less than 0.15.

It is preferred that the total number of organic radicals per silicon atom be from 0.95 to 1.2 inclusive $(x+y)$ and that at least 80 mol percent of this siloxane be $(C_6H_5)SiO_{1.5}$ units. The best results are obtained with a hydroxyl-containing siloxane which has an average of from 0.98 to 1.05 phenyl radicals per silicon atom and contains no R' radicals (i.e., $y$ is 0).

It is essential that the phenyl-containing siloxane contain an average of at least two radicals per molecule which are either hydroxyl radicals or —OM radicals, wherein M is an alkali metal or a quaternary ammonium radical. As in the case of siloxane (1), the phenyl-containing siloxane (2) can contain other reactive radicals, such as alkoxy radicals. However, it is preferred that all the reactive radicals are hydroxy radicals.

It is to be understood that either of the two types of siloxanes employed herein (i.e., (1) and the phenyl-containing siloxane) can be homopolymeric, copolymeric or mixtures of siloxanes and further that all of the organic radicals attached to any one silicon atom can be the same or can be different. It is preferred that these siloxanes be either a homopolymer or copolymer rather than mixtures.

Although the phenyl-containing siloxanes are preferred for (2), the organosilicon compound (2) can be a phenylsilanol or a mixture of phenyl-containing silanols. Said silanols can be represented by the formula

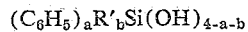
$(C_6H_5)_aR'_bSi(OH)_{4-a-b}$

R' is a monovalent hydrocarbon radical. Suitable examples of such radicals have been set forth above for R'. The subscript $a$ has an average value of from 0.65 to 1.3, $b$ has an average value of less than 0.4, and the sum of $a+b$ has an average value from 1 to 1.3 inclusive. It is essential that at least 60 mol percent of any silanol mixture be of the formula $(C_6H_5)Si(OH)_3$. It is preferred that at least 80 mol percent of any silanol mixture be $(C_6H_5)Si(OH)_3$, that $a$ has an average value of from 0.9 to 1.2 inclusive and $b$ has an average value of less than 0.15 and that the sum of $a+b$ be from 1 to 1.2 inclusive. The best results are obtained with

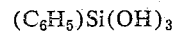
$(C_6H_5)Si(OH)_3$

From 8 to 220 parts by weight of the organosilicon compound (2) can be used per 100 parts by weight of siloxane (1). It is preferred that 40 to 175 parts by weight of (2) be used per 100 parts of (1). It is more preferred that from 50 to 160 parts by weight of (2) be used per 100 parts of (1). Still better results are obtained when 60 to 140 parts by weight of (2) are used, with the best results being obtained when 70 to 125 parts by weight of the siloxane is used per 100 parts of (1). The best results are obtained when from 70 to 125 parts of a hydroxyl-containing monophenylsiloxane are used per 100 parts of a hydroxy-endblocked dimethylsiloxane which has from 300 to 3500 silicon atoms per molecule.

It is essential that a catalyst for the condensation of silicon-bonded hydroxyl radicals (3) be used to catalyze the reaction between the phenyl-containing organosilicon compound (2) and the diorganosiloxane (1). When a phenyl-containing siloxane which contains a catalytic amount of residual —OM radicals is used, it is not necessary to add any additional catalyst. In this case components (2) and (3) of the reaction mixture are one and the same. Examples of suitable —OM radicals are —OK, —ONa, —OLi, —OCs, and —ONR''$_4$, wherein R'' is an organic radical such as benzyl, ethyl, $\beta$-hydroxyethyl, methyl, $\beta$-phenylethyl, octadecyl and cyclohexyl. When (2) contains no —OM groups or an insufficient number to properly catalyze the condensation of (1) and (2), then a separate catalyst is employed.

The preferred catalysts for the condensation of silicon-bonded hydroxyl radicals are the alkali metal hydroxides, such as KOH, LiOH, NaOH, CsOH and RbOH. The preferred alkali metal hydroxide is KOH. It is preferred to use potassium hydroxide in a sufficient amount to provide one potassium atom per 100 to 100,000 silicon atoms. The best results are obtained when there is one potassium atom per 500 to 10,000 silicon atoms. These preferred potassium to silicon ratios are also preferred when the phenyl-containing siloxane contains —OK radicals. The organosilicon salts of such alkali metal hydroxides can also be used. Suitable examples of such salts are

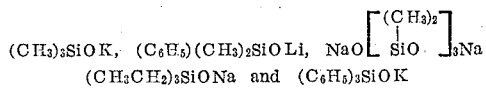

A further type of catalyst for the condensation of silicon-bonded hydroxyl radicals is found in the oxides of barium, strontium and calcium. Acids such as hydrochloric and sulfuric acids are also operative.

The phenoxide derivatives described in the copending application of Hyde and Schultz, Serial No. 191,738, filed May 2, 1962, entitled "Method of Polymerizing Hydroxylated Organosilicon Compounds" can be used as a catalyst in this invention. That application is hereby incorporated by reference. Specific examples of such phenoxide derivatives are potassium phenoxide, sodium-p-phenoxide-methylphenoxide, $CsOC_6H_4C_6H_5$,

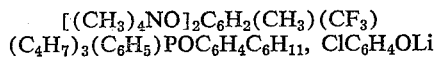

$(RbO)_2C_6H_3ONa$, and lithium phenoxide. These compounds can be represented by the general formula

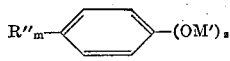

wherein $R''$ contains up to 10 carbon atoms and is either a monovalent hydrocarbon, halohydrocarbon or hydrocarbonoxy radical or a halogen atom, $M'$ is either a tetraalkyl- or tetraaryl-nitrogen radical, or a tetraalkyl- or tetraaryl-phosphorus radical, the subscript $m$ has a value from 0 to 3 inclusive, $z$ has a value of from 1 to 3 inclusive and $m+z$ is an integer of from 1 to 4. The preferred alkali metal phenoxide is potassium phenoxide.

Other types of catalysts for the condensation of silicon-bonded hydroxyl radicals are the quaternary ammonium hydroxides and the organosilicon salts of such hydroxides. The organosilicon salts of quaternary ammonium hydroxides can be represented by the general formula $Y_aSi(OQ)_bO_{4-a-b/2}$, wherein Y is an alkali stable organic radical such as monovalent hydrocarbon radicals or fluorinated monovalent hydrocarbon radicals and Q is a quaternary ammonium ion, $a$ has an average value of from 1 to 3 inclusive and $b$ has an average value of from 0.1 to 3 inclusive. Specific examples of such catalysts are β-hydroxyethyltrimethyl ammonium hydroxide, benzyltrimethyl ammonium hydroxide, didodecyldimethylammonium hydroxide, $(CH_3)_3SiON(CH_3)_4$,

the benzyltrimethyl ammonium salt of dimethylsilane diol, octadecyltrimethyl ammonium hydroxide, tetradodecyl ammonium hydroxide, tritetradecylmethyl ammonium hydroxide, and hexadecyloctadecyldimethyl ammonium hydroxide.

Primary, secondary and tertiary amines can be used as catalysts in this invention. It is preferred that these amines have a dissociation constant of at least $10^{-10}$. Examples of operative amines include the following: brucine, sec-butylamine, cocaine, diethylbenzylamine, diethylamine, diisoamylamine, diisobutylamine, dimethylamine, dimethylaminoethylphenol, dimethylbenzylamine, dipropylamine, ethylamine, ethylenediamine, hydrazine, isoamylamine, isobutylamine, isopropylamine, menthanediamine, methylamine, methyldiethylamine, t-octylamine, t-nonylamine, piperidine, n-propylamine, t-octadecylamine, quinine, tetramethylenediamine, triethylamine, triisobutylamine, trimethylamine, trimethylenediamine, tripropylamine, L-arginine, L-lysine, aconitine, benzylamine, cinchonidine, codeine, coniine, emetine, o-methoxybenzylamine, m-methoxybenzylamine, p-methoxybenzylamine, N,N-methoxybenzylamine, o-methylbenzylamine, m - methylbenzylamine, p - methylbenzylamine, N,N-methylbenzylamine, morphine, nicotine, novocain base, epsilonphenylamylamine, delta-phenylbutylamine, β-phenylethylamine, β-phenylethylmethylamine, gamma - phenylpropylamine, N,N-isopropylbenzylamine, physostigimine, piperazine, quinidine, solamine, sparteine, tetramethylquanine, thebaine, t-butyl-2,4 - dinitrophenylamine, t-butyl-2-hydroxy-5-nitrobenzylamine, t-butyl - 4 - isonitrosoamylamine, t-octylamylamine, t-octyl-2-(β-butoxyethoxy)ethylamine, 2,4,6 - tris(dimethylamino)phenol, aniline, phenylhydrazine, pyridine, quinoline, p-bromophenylhydrazine, n-nitro-o-toluidine, β-ethoxyethylamine, tetrahydrofurfurylamine, m-aminoacetophenone, iminodiacetonitrile, putrescine, spermin, gamma-N,N-dimethylaminopropylpentamethyldisiloxane, p-toluidine and veratrine.

Also operative as catalysts are the condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, α,β-dimethylacrolein and amylamine, butyraldehyde and butylamine, acrolein and allylamine and formaldehyde and heptylamine.

Aromatic sulfonic acids, such as benzene sulfonic acid and p-toluene sulfonic acid, can be used as the catalyst in this invention. Sulfonic acid catalysts of the general formula $XSO_3H$ in which each X is either a perfluoroalkyl radical of less than 13 carbon atoms, a $H(CF_2)_c$— radical or a $F(CF_2)_cCFHCF_2$— radical where $c$ has a value of less than 3 are operative. Examples of these catalysts are $CF_3SO_3H$, $C_2F_5SO_3H$, $C_4F_9SO_3H$, $C_8F_{17}SO_3H$, $HCF_2CF_2SO_3H$, $CF_2HSO_3H$ and $$CF_3CFHCF_2SO_3H$$

Another type of catalyst for the condensation of silicon-bonded hydroxyl radicals is the alkali metal alkylene glycol monoborates. Suitable examples of such compounds are:

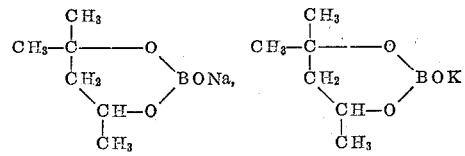

and

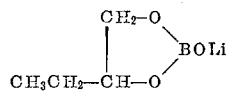

Another type of catalyst for the condensation of silicon-bonded hydroxyl radicals is the organic isocyanates which are free of active hydrogen and which have only one isocyanate group per molecule. These isocyanate catalysts are described in detail in U.S. Patent 3,032,530 (Falk). Specific examples of isocyanates which are operative herein are aliphatic isocyanates such as methyl isocyanate, butyl isocyanate, octadecyl isocyanate and hexenyl isocyanate; cycloaliphatic isocyanates such as cyclohexyl isocyanate and cyclohexenyl isocyanate; and aryl isocyanates such as xenyl isocyanate, bromophenyl isocyanate, anthracyl isocyanate, para-dimethyl aminophenyl isocyanate, and para-methoxyphenyl isocyanate.

Certain amine salts can also be used as catalyst in this invention. These amine salts are the reaction products of basic amino compounds, i.e., ammonium or organic amines (including silylorganic amines), with phosphoric or carboxylic acids. These amine salts are described in the copending application of Hyde, Serial No. 826,421, filed July 13, 1959, entitled, "Silanol Condensation Catalysts," now U.S. 3,160,601 which is hereby incorporated by reference. The term basic amino compound means compounds containing at least one nitrogen atom attached to no more than three carbon atoms. The basic amino compound can be a primary, secondary or tertiary amine, silylorganic amine, polyamine or ammonia. The amine can contain one or more amino groups and can contain functional organic groups which are free of active hydrogen. The preferred salts are the amino carboxylic acid salts which have at least six carbon atoms. Polycarboxylic acid salts can also be used. These amine salts can be normal, acidic or basic. Examples of such amine salts include: di-2-ethylhexylamine acetate, triphenylsilpropylamine formate, trimethylsiloxydimethylsilhexylamine hexoate, 4,4'-diaminobenzophenone butyrate, 4,4'-diaminodiphenylether decanoate, tri-n-butylamine acrylate, 3,4-dichloroaniline caproate, aniline octanoate, didodecylamine-o-chlorophenoxyacetate, ethylamine 3-ethoxypropionate, diethylene triamine monooleate, diisopropylamine palmitate, trimethylamine stearate, benzylhydrazine hexoate, 2,5-dimethylpiperazine octoate, tetramethylguanidine 2-ethylhexoate, di(octadecylamine)sebacate, ethylenediaminedihexoate, tetraethylenepentaamine diphosphate, 1,2-aminopropanephenylphosphate and ammonium stearate together with the salts of any other of the amines and acids shown above.

The catalysts disclosed in the Fianu U.S. Patent 2,902,468, entitled, "Method of Polymerizing Hydroxylated Siloxanes," are operative as catalysts in this invention. This patent is hereby incorporated by reference. The catalysts disclosed in this patent are β-aminobutyric acids of the general formula

lactams of such acids of the formula

and α-amino acids of the formula

wherein R''' is a monovalent aliphatic hydrocarbon radical of from 5 to 30 inclusive carbon atoms, R'''' is an aliphatic hydrocarbon acyl group of from 5 to 30 inclusive carbon atoms and Y' is either methyl or hydrogen. Specific examples of such materials are N-caproyl glycine, N-caproyl sarcosine, N-palmityl sarcosine, N-oleyl glycine, N-benenyl glycine and N-linoleyl glycine.

The carboxylic acid salts of certain metals are operative as catalysts in this invention. Specific examples of the metals that can be used are lead, tin, nickel, cobalt, iron, cadmium, chromium, zinc, manganese, aluminum, magnesium, barium, strontium, calcium, cesium, rubidium, sodium and lithium. Specific examples of these salts are the naphthenates of the above metals such as lead naphthenate, cobalt naphthenate and zinc naphthenate; salts of fatty acids such as iron 2-ethylhexoate, stannous 2-ethylhexoate and chromium octoate; salts of aromatic carboxylic acids such as dibutyl tin dibenzoate; salts of polycarboxylic acid such as dibutyl tin adipate and lead sebacate; and salts of hydroxy carboxylic acids such as dibutyl tin dilactate.

The amount of catalyst required to affect the reaction is dependent upon a variety of factors, such as temperature and time of reaction, type of catalyst and reactants used. Thus, no meaningful numerical limits can be set for the catalyst concentration. However, the optimum concentration for any particular system can be easily determined by heating a mixture of (1) and (2) in solution and observing the time required to give a peroxide vulcanizable product as described, infra. In general, the silicon-bonded hydroxyl condensation catalysts are used in the same concentration applicable to their use in effecting siloxane condensations in general.

The previously defined organosilicon compounds (1) and (2) are mixed and heated in a suitable solvent at a temperature sufficient to produce a peroxide vulcanizable product. The temperature and the time required for heating will depend upon the organosilicon compounds and catalyst used and the concentration of the organosilicon compounds in the solvent. If the mixture is heated for too long a period of time, the vulcanized product flows excessively at 150° to 250° C. and its physical properties cannot be measured. If the mixture is not heated long enough, the resulting siloxane block copolymer has poor physical properties. It is preferred that this heating step be at the reflux temperature of the mixture for a time sufficient to produce a peroxide vulcanizable product. Generally, reflux times of from 0.5 to 20 hours are sufficient. Obviously no meaningful numerical limitations can be placed upon the heating time and temperature. The optimum time for any particular system can be determined by observing the time required to give a peroxide vulcanizable product. The time required will vary depending upon the organisilicon compounds and catalysts used and the solid concentration. Although it is not essential to remove the by-products produced by this reaction during the heating step, it is preferred that a substantial portion of these by-products be removed during this step. These by-products can be removed as produced or can be removed near the end of the heating step. It is preferred that they be removed as they are produced.

Although it is preferred to add the entire amount of organosilicon compound (2) prior to heating, an amount of this material can be added after the heating and catalyst deactivation steps but prior to the solvent removal step. However, it is essential that at least 8 parts by weight of organosilicon compound (2) per 100 parts of the siloxane (1) be added prior to the heating step. Although up to 212 parts by weight of organosilicon compound (2) can be added after the heating and catalyst deactivation steps, it is preferred that 80 parts or less be added. In order to obtain a siloxane block copolymer which is curable to a silicone elastomer with the superior elastic properties such as improved fatigue resistance, the organosilicon compound (2) must be present in at least 20 parts by weight per 100 parts by weight of the siloxane (1). These siloxane block copolymers can be made by the above described method such as 8 parts by weight of organosilicon compound (2) and 100 parts by weight of the siloxane (1) are reacted to produce a block copolymer. An additional amount of organosilicon compound (2) can be added to make the amount of the organosilicon compound (2) at least 20 parts by weight per 100 parts by weight of siloxane (1). Preferably, the organosilicon compound (2) is present in at least 40 parts by weight of (2) per 100 parts by weight of the siloxane (1) for better results. The only requirement for the addition of an additional amount of organosilicon compound (2) is that it is added prior to the solvent removal step and after the heating and catalyst deactivation step.

Any inert solvent in which both siloxane (1) and organosilicon compound (2) are soluble at the temperature of the reaction can be used. The term "inert" means that the solvent does not react appreciably with the siloxanes or the catalysts. Aromatic solvents such as xylene, benzene and toluene, are preferred. However, other suitable solvents include aliphatic hydrocarbons such as petroleum ether, halogenated hydrocarbons such as chlorobenzene or esters can also be used. It should be pointed out that the reaction product should also be soluble in the solvent used in order to keep the product substantially homogeneous during the solvent removal step.

The only limitation upon the concentration of organosilicon solids in the solvent is that there should be no appreciable gelation during the heating step. The maximum solids concentration permissible will vary depending upon the solvent, organosilicon compound and catalyst used. It is preferred that the solids concentration be less than 40 to 50 percent by weight based upon the total weight of the mixture. There is no lower limitation upon the solids concentration since gelation is not a problem in the lower concentration ranges. However, the efficiency of the system is decreased when the solid concentration is below 10 percent by weight.

Although not essential, better results are obtained when the catalyst is deactivated after the heating step. This is especially true when the siloxane block copolymer is to be stored for a long period of time prior to vulcanization, since the reaction will continue resulting in poorer physical properties. The methods of deactivating catalysts are well known in the art and generally involve the removal and/or neutralization of the catalyst. It is preferred that at least a substantial portion of the catalyst be removed from the reaction product. When the alkali metal hydroxides are used it is preferred that the reaction product be carbonated after the completion of the heating step and then filtered or decanted from the precipitate. The best results are obtained if the reaction product is carbonated and filtered. Another method of deactivating the catalyst is by adding a fume silica to the reaction product, followed by decantation from the precipitate. Alternatively, the reaction product can be refluxed for a brief period of time prior to the decantation. It should be pointed out that although catalyst deactivation step is preferred, it is not an essential step in this process. It is obvious that the method of catalyst deactivation will depend upon the particular catalyst used.

It is essential that the solvent be removed from the reaction product prior to the vulcanization of the siloxane block copolymer. There must be sufficient agitation during this step to keep the product substantially homogeneous during the solvent removal. One method of obtaining this result is by masticating the reaction product by hot milling the reaction product. Obviously, the temperature and time of the milling step should be sufficient to remove substantially all of the solvent present. The conditions of milling, such as mill speed and pressure, must be sufficient to keep the product substantially homogeneous during this step. Although milling is the preferred manner of removing the solvent, other methods, such as removing the solvent while mixing, can be used as long as there is sufficient agitation to keep the product substantially homogeneous. It is preferred that the solvent removal step be at a temperature near the boiling point of the solvent.

As illustrated in Example 10, a small amount of a low molecular weight (i.e., having fewer than 200 silicon atoms per molecule) hydroxyl-endblocked diorgansiloxane fluid can be added to the reactants after solvent removal. This additive can be any conventional low molecular weight diorganosiloxane fluid. Examples of such siloxanes are dimethylsiloxane, phenylmethylsiloxane, methylpropylsiloxane and a copolymer of 95 mol percent phenylmethylsiloxane and 5 mol percent of methylvinylsiloxane.

The siloxane block copolymers of the present invention consist essentially of (1) organopolysiloxane blocks of the formula $(R_nSiO_{4-n/2})_z$, wherein R is selected from the group consisting of methyl, phenyl and vinyl radicals, $n$ has an average value of from 1.98 to 2.00 inclusive, $z$ has an average value of at least 110, there being an average of at least 0.75 methyl radical per silicon atom and an average of no more than 0.15 vinyl radical per silicon atom in said organopolysiloxane (1), said organopolysiloxane-containing no more than 50 mol percent $(C_6H_5)_2SiO$ units, and (2) a siloxane represented by the unit formula $(C_6H_5)_xR'_ySiO_{4-x-y/2}$, wherein R' is a monovalent hydrocarbon radical, $x$ has an average value of from 0.65 to 1.3 inclusive, $y$ has an average value of less than 0.4, and the sum of $x+y$ is from 0.95 to 1.3 inclusive with at least 60 mol percent of said siloxane (2) being $(C_6H_5)SiO_{1.5}$ units, the proportions of (1) and (2) in said block copolymer being 8 to 175 parts by weight of (2) per 100 parts by weight of (1).

The siloxane block copolymers preferably have the siloxane blocks (2) present in amounts from 40 to 175 parts by weight per 100 parts by weight of organopolysiloxane (1). Still more preferred, siloxane block copolymers are obtained when there is from 50 to 160 parts by weight of (2) per 100 parts by weight of (1). The siloxane block copolymers with the best properties are those which contain from 70 to 125 parts by weight of a monophenylsiloxane (2) per 100 parts by weight of a dimethylsiloxane (1) which has at least 200 silicon atoms per molecule and still better properties when the dimethylsiloxane (1) has from 300 to 3500 silicon atoms per molecule.

The siloxane block copolymers of this invention as described above are cured simply by heating at a temperature above the decomposition point of the peroxide vulcanizing agent. This is a conventional technique in the art. Examples of operative organic peroxides include benzoyl peroxide, tert-butylbenzoate, dicumylperoxide, ditert-butylperoxide, tert-butylperacetate, 2,5-dimethyl-2,5-dihydroperoxyhexane, bis(2,4-dichlorobenzoyl)peroxide. These peroxides can be used in amounts ranging from 0.1 to 10 parts by weight per 100 parts of the siloxane.

Press vulcanization is an effective method of curing these block copolymers. Usually a temperature of from 120° C. to 200° C. for 5 to 15 minutes is sufficient. An aftercure at 150° C. to 250° C. for one 24 hours is also usually desirable.

When silica fillers having organosilyl units bonded to the silica substrate are incorporated with the siloxane block copolymers of this invention, a small amount of cyanoguanidine can be used in addition to the peroxide vulcanizing agent. The use of cyanoguanidine as a vulcanizing agent is disclosed in copending application of Polmanteer and Metevia, Serial No. 131,987, filed August 17, 1961, and entitled, "Cyanoguanidine as a Vulcanizing Agent for Silicone Rubber," now United States Patent No. 3,086,954.

The siloxane block copolymers of this invention can be used to produce elastomers having high tensile strengths without the addition of any filler. However, a small amount of a filler can be incorporated with the siloxane block copolymers of this invention. Illustrative of the fillers that can be incorporated with these siloxane block copolymers are those disclosed in U.S. Patent 2,863,846, of Tyler.

The compositions of this invention can contain other additives such as compression set additives, thermal stabilizers, oxidation inhibitors, plasticizers, pigments and other materials commonly employed in organosilicon rubbers.

The elastomers of this invention have excellent elasticity and very high fatigue resistance as illustrated in Examples 8 and 9. These elastomers also have high tensile strengths at both room and elevated temperatures. It was most unexpected that these high strengths could be obtained with a rubber stock without the incorporation of a silica filler.

The elastomers of this invention can be used in places where conventional silicone elastomers are used, since they also possess excellent high temperature properties. These elastomers are especially valuable for uses where excellent elasticity and/or high fatigue resistance is desired.

The following examples are illustrative only and should not be construed as limiting the invention which is properly delineated in the appended claims. Unless otherwise stated, all viscosities were determined at 25° C.

In the examples the following types of materials were used:
A. A hydroxyl-containing monophenylsiloxane,
B. A hydroxyl-free monophenylsiloxane,
C. [(C$_6$H$_5$)SiO$_{1.5}$]$_8$, and
D. A hydroxyl-free monophenylsiloxane containing residual potassium.

*Example 1*

The composition, reaction conditions and elastomeric properties of the samples prepared in this example are set forth in Table I. 100 parts by weight of a hydroxy-endblocked dimethylsiloxane and 100 parts by weight of a monophenylsiloxane of the type indicated in Table I were mixed in toluene and placed in a three-necked flask equipped with an agitator and azeotrope trap. The mixture was refluxed for the designated time with agitation and removal of the evolved water. The reaction mass was then carbonated with Dry Ice at room temperature and filtered. The solvent was then removed on a hot two-roll mill. Unless otherwise noted, two parts of tert-butylperbenzoate per 100 parts of the dimethylsiloxane was then added and the sample press-vulcanized for 10 minutes at 150° C. and then heated for one hour at 150° C. in a hot air circulating oven. The sample was then aftercured at 250° C. for the designated time. The tensile strength in pounds per square inch and the percent elongation at break was measured after 24 and 72 hours curing at 250° C. The catalyst concentration is expressed as a ratio of potassium (K) atom to the total silicon (Si) atoms in the siloxanes. The potassium hydroxide, potassium phenoxide and potassium hexylene glycol monoborate catalysts were added in the appropriate amount to give the desired potassium to silicon ratio. The term potassium hexylene glycol monoborate refers to

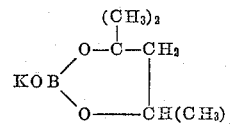

The percent total solids in toluene for each sample is set forth in Table I. The term "hrs. at reflux" in Table I merely indicates the time that the sample was refluxed. The viscosity of the reaction mass at the end of the refluxing is the viscosity of the entire composition including solvent.

This example illustrates the results obtained by varying the average molecular weight as measured as viscosity of the hydroxy-endblocked dimethylsiloxane. It was not possible to vulcanize sample No. 1. This example also illustrates the results obtained by varying the reflux time. If the sample is refluxed for too long a period of time, the flow of the vulcanized sample at 150° C. is so great that the physical properties cannot be measured. If the sample is not refluxed for a sufficient period of time, the material has poor physical properties. This example also illustrates that a hydroxy-free monophenylsiloxane is inoperative, e.g., samples 11, 12, 13 and 14. This example also illustrates that a hydroxy-free monophenylsiloxane which contains residual potassium is operative as illustrated in sample II 15.

TABLE I

| | Siloxane Composition | | Type of Catalyst | Conc. of Catalyst (K/Si ratio) | Reaction Conditions | | | Elastomeric Properties | | | |
|---|---|---|---|---|---|---|---|---|---|---|---|
| | | | | | | | | 24 hrs. at 250° C. | | 72 hrs. at 250° C. | |
| | Dimethyl siloxane visc. in cs. | Type-monophenyl siloxane | | | Percent Solids in toluene | Hrs. at Reflux | Visc. in cs. at end of reflux | Tensile, p.s.i. | Percent Elong. | Tensile, p.s.i. | Percent Elong. |
| 1 | 24.5 | A | KOH | 1/2,000 | 40 | 1 | 2.2 | Unable to vulcanize, sample flowed at 250° C. | | | |
| 2 | 2,250 | A | KOH | 1/2,000 | 20 | .5 | 5.4 | 920 | 370 | 1,100 | 180 |
| 3 | 2,250 | A | KOH | 1/2,000 | 20 | 1 | 4.9 | Unable to vulcanize, sample flowed at 250° C. | | | |
| 4 | 12,900 | A | KOH | 1/2,000 | 20 | 1 | | 1,220 | 450 | 1,360 | 260 |
| 5 | 12,900 | A | KOH | 1/2,000 | 20 | 3 | | Unable to vulcanize, sample flowed at 250° C. | | | |
| 6 | 13,100 | A | KOH | 1/4,000 | 20 | 1 | | 1,295 | 410 | 1,340 | 205 |
| 7 | 14,100 | A | KOH | 1/2,000 | 20 | 1 | 7.4 | 1,050 | 360 | 1,100 | 300 |
| 8 | 1.29×10$^6$ | A | KOH | 1/2,000 | 20 | 2 | 6.9 | 1,290 | 390 | 1,070 | 210 |
| 9 | 15×10$^6$ | A | KOH | 1/2,000 | 20 | .5 | 18 | 190 | 150 | 210 | 140 |
| 10 | 15×10$^6$ | A | KOH | 1/2,000 | 20 | 3 | 5.3 | 960 | 270 | 915 | 290 |
| 11 | 13,728 | B | KOC$_6$H$_5$ | 1/2,000 | 20 | .5 | | Unable to vulcanize, sample is soft and sticky | | | |
| 12 | 13,728 | B | KOC$_6$H$_5$ | 1/2,000 | 20 | 4 | | | | | |
| 13 | 13,728 | B | Potassium hexylene glycol monoborate. | 1/2,000 | 20 | 1 | | | | | |
| 14 | 13,100 | C | KOH | 1/2,000 | 20 | 2.5 | | Unable to vulcanize, sample is a fluid | | | |
| 15 | 14,100 | D | —OK[1] | 1/2,000 | 21.5 | 4 | | 574 | 410 | 940 | 205 |
| 16[2] | 1.5×10$^7$ | A | | 1/2,000 | 20 | 1.5 | | 878 | 195 | 965 | 175 |
| 17 | 99,200 | A | | 1/2,000 | 20 | | | 708 | 390 | 1,183 | 350 |

[1] Potassium was present in the monophenylsiloxane in an amount to give the indicated K to Si ratio.
[2] 4 parts by weight of tert-butyl perbenzoate used per 100 parts of dimethylsiloxane.

Example 2

In this example the results obtained by varying the weight ratio of hydroxy-endblocked dimethylsiloxane to hydroxy-containing monophenylsiloxane are compared. The hydroxy-endblocked dimethylsiloxane used in this example has a viscosity of 14,100 cs. The monophenylsiloxane is a hydroxy-containing monophenylsiloxane. The results of these experiments are set forth in Table II. In each case in Table II, there was 20 percent by weight total organosiloxane solids in toluene prior to refluxing. Potassium hydroxide was used in each case in an amount to yield 1 K per 2000 Si. Unless otherwise noted, 2 parts by weight of tert-butylperbenzoate per 100 parts of the dimethylsiloxane was used to vulcanize the siloxane block copolymer. The same procedure was used in this example as in Example 1.

TABLE II

| | Siloxane Composition, Pts. by Wt. | | Hrs. at reflux | Elastomeric Properties | | | |
|---|---|---|---|---|---|---|---|
| | | | | 24 hrs. at 250° C. | | 72 hrs. at 250° C. | |
| | Dimethylsiloxane | Monophenylsiloxane | | Tensile, p.s.i. | Percent Elong. | Tensile, p.s.i. | Percent Elong. |
| 1 | 100 | 40 | 2 | 340 | 265 | 240 | 140 |
| 2 | 100 | 60 | 1 | 775 | 330 | 740 | 190 |
| 3 | 100 | 80 | 3 | 995 | 365 | 1,065 | 245 |
| 4 | 100 | 100 | 1 | 1,030 | 360 | 1,180 | 195 |
| 5 | 100 | 120 | 2 | 1,085 | 345 | 1,325 | 195 |
| 6 | 100 | 140 | 1 | 985 | 145 | 1,070 | 120 |
| 7 | 100 | 140 | 3 | 1,060 | 180 | 1,390 | 185 |
| 8 | 100 | 160 | 3 | 915 | 110 | 1,120 | 90 |
| 9 [1] | 100 | 125 | 1 | 710 | 170 | 1,040 | 180 |
| 10 | 100 | 140 | 2 | 1,060 | 170 | 1,290 | 160 |
| 11 [1] | 100 | 75 | 1 | 760 | 460 | 860 | 350 |
| 12 [1] | 100 | 100 | 1 | 870 | 390 | 1,040 | 310 |

[1] 3 parts by weight of tert-butylperbenzoate per 100 parts of dimethylsiloxane was used.

Example 3

In this example the results obtained by adding additional monophenylsiloxane after the refluxing and filtration step, but prior to the solvent removal step are compared with the results obtained by adding this additional amount of monophenylsiloxane prior to reflux. As illustrated in sample No. 6 of Table III, it is preferred to use at least 40 parts of the monophenylsiloxane per 100 parts of the dimethylsiloxane in the reflux step. The process steps and manner of testing the rubber have been described in detail in Example 1. In each case, 100 parts by weight of a hydroxy-containing dimethylsiloxane of 14,100 cs. viscosity and a hydroxy-containing monophenylsiloxane was used. The term "initial parts by weight" indicates the amount of monophenylsiloxane added prior to reflux. Additional monophenylsiloxane was added after the refluxing and filtration steps, but prior to removing the solvent on a hot mill. In each case, sufficient toluene was used to provide a 20 percent concentration of siloxane solids. Unless otherwise noted, 2 parts by weight of tert-butylperbenozate per 100 parts of dimethylsiloxane was used to vulcanize the siloxane block copolymer. Sufficient potassium hydroxide was used to provide a K/Si ratio of 1/2,000.

TABLE III

| | Monophenylsiloxane, Pts. by Wt. | | Hrs. at reflux | Elastomeric Properties | | | |
|---|---|---|---|---|---|---|---|
| | Initial | Added after reflux | | 24 hrs. at 250° C. | | 72 hrs. at 250° C. | |
| | | | | Tensile, p.s.i. | Percent Elong. | Tensile, p.s.i. | Percent Elong. |
| 1 | 100 | 10 | 2 | 1,040 | 320 | 1,380 | 205 |
| 2 | 100 | 20 | 2 | 1,025 | 300 | 1,420 | 225 |
| 3 | 120 | | 2 | 1,085 | 345 | 1,325 | 195 |
| 4 | 100 | 40 | 2 | 905 | 215 | 1,360 | 165 |
| 5 | 140 | | 3 | 1,060 | 180 | 1,390 | 185 |
| 6 | 10 | 90 | 2 | 640 | 180 | 355 | 115 |
| 7 | 100 [1] | 20 | 2 | 650 | 270 | 910 | 250 |

[1] 1 part cyanoguanidine and 1 part tert-butylperbenzoate per 100 parts dimethylsiloxane were used as a vulcanizing agent.

Example 4

In this example the results obtained by varying the type of solvent and catalyst used are compared. In each case 100 parts of a hydroxy-endblocked dimethylsiloxane with a viscosity of 14,100 cs. was used per 100 parts of a hydroxy-containing monophenylsiloxane. The type of catalyst and concentration of catalyst are set forth in Table IV. The viscosity of the reaction mass (including solvent) prior to and after refluxing are set forth in Table IV. Unless otherwise noted, 2 parts by weight of tert-butylperbenzoate per 100 parts of dimethylsiloxane was used to vulcanize the siloxane block copolymer. The process steps and manner of testing the cured elastomer have been described in detail in Example 1.

TABLE IV

| | Type of catalyst | Conc. of catalyst | Solvent | Percent solids in solvent | Hrs. at reflux | Viscosity in cs.[1] | | Elastomeric Properties | | | |
|---|---|---|---|---|---|---|---|---|---|---|---|
| | | | | | | | | 24 hrs. at 250° C. | | 72 hrs. at 250° C. | |
| | | | | | | Prior to reflux | After reflux | Tensile, p.s.i. | Percent Elong. | Tensile, p.s.i. | Percent Elong. |
| 1 | KOH | 1 K/2,000 Si | Benzene | 20 | 1 | | | 1,185 | 250 | 1,240 | 185 |
| 2 | Potassium hexylene glycol monoborate. | 1 K/3,600 Si | do | 20 | 1 | | | 1,040 | 210 | 1,000 | 180 |
| 3 | KOH | 1 K/2,000 Si | Toluene | 20 | 1 | 5.95 | 8.47 | 967 | 335 | 1,200 | 270 |
| 4 | KOC$_6$H$_5$ | 1 K/2,000 Si | do | 20 | 1 | 5.95 | 7.45 | 866 | 320 | 1,176 | 300 |
| 5 | KOH | 1 K/2,000 Si | Xylene | 20 | 1 | 6.47 | 7.73 | 787 | 300 | 906 | 195 |
| 6 | Tetramethyl guanidine di-2-ethyl hexoate. | .2% based on wt. of total siloxane solids. | do | 20 | 4 | | 9.57 | 939 | 340 | 1,039 | 300 |
| 7 | NaOH | 1 Na/2,000 Si | Toluene | 20 | 4 | | 7.86 | 1,040 | 300 | 1,010 | 175 |
| 8 | Tetramethylguanidine di-2-ethyl hexoate. | .2% based on wt. of total siloxane solids. | do | 20 | 4 | | 11 | 1,000 | 335 | 1,042 | 300 |
| 9 | LiOH | 1 Li/2,000 Si | do | 20 | 72 | | | 1,007 | 219 | 1,141 | 227 |
| 10 | LiOH | 1 Li/2,000 Si | do | 20 | 288 | | | 1,042 | 303 | 1,110 | 207 |
| 11 | LiOH | 1 Li/2,000 Si | do | 20 | 456 | | | 1,083 | 308 | 912 | 183 |
| 12[2] | n-Hexyl amine | 2% by wt. based on wt. of total siloxane solids. | do | 20 | 96 | | | 1,223 | 238 | 918 | 141 |
| 13 | Tetramethylguanidine 2-ethylhexoate. | do | do | 20 | 5.5 | | 8.32 | 1,160 | 365 | 1,170 | 325 |
| 14 | do | do | do | 20 | 11.5 | | 8.7 | 1,100 | 338 | 1,130 | 305 |
| 15 | do | do | do | 20 | 22 | | 8.18 | 1,180 | 360 | 1,230 | 355 |
| 16 | do | .8% by wt. based on wt. of total siloxane solids. | do | 20 | 1 | | 7.7 | 925 | 345 | 1,020 | 380 |
| 17 | do | do | do | 20 | 3 | | 6.9 | 980 | 315 | 1,150 | 340 |
| 18 | do | do | do | 20 | 5.5 | | 5.88 | 1,060 | 390 | 1,130 | 365 |
| 19 | do | do | do | 20 | 11.5 | | 5.12 | 950 | 365 | 1,055 | 410 |
| 20 | do | 2% by wt. based on total pts. siloxane solids. | do | 20 | .5 | | 7.43 | 910 | 415 | 920 | 245 |
| 21 | p-Toluene sulfonic acid | .75% by wt. based on total siloxane solids. | do | 17 | [3]1 | | | 830 | 254 | 908 | 220 |
| 22 | Stannous octoate | .0138% by wt. based on total siloxane solids. | do | 20 | [4]2 | | | 615 | 270 | 505 | 228 |

[1] Viscosities were measured at 20 percent solids in toluene.
[2] 3 parts by wt. tert-butylperbenzoate per 100 parts of dimethylsiloxane.
[3] The catalyst was deactivated at the end of the refluxing step by the addition of an excess of LiOH and then filtered prior to the addition of Dry Ice. The rubber stock was then milled as described in Example 1.
[4] The catalyst was deactivated at the end of the refluxing step by the addition of an equivalent amount of LiOH and then dried with Na$_2$SO$_4$ prior to the addition CO$_2$ in the form of Dry Ice. The rubber stock was then milled as described in Example 1.

*Example 5*

In this example, the elastomeric properties of samples refluxed at various solids concentrations are compared. 100 parts by weight of a hydroxy-endblocked dimethylsiloxane with a viscosity set forth in Table V was used per 100 parts of a hydroxy-containing monophenylsiloxane. Potassium hydroxide was used as a catalyst in an amount sufficient to provide 1K/2000 Si. The viscosity of the samples was determined after reflux but prior to removing the solvent. In each case, 2 parts by weight of tert-butylperbenzoate per 100 parts of dimethylsiloxane was used to vulcanize the siloxane block copolymer. The process steps and the manner of testing the cured elastomer have been described in detail in Example 1.

*Example 6*

In this example the results obtained by varying the amount of vulcanizing agent used are compared. This example also demonstrates that a reinforcing filler can be incorporated into the siloxane block copolymer. In each case, 100 parts of a hydroxy-endblocked dimethylsiloxane with a viscosity of 14,100 cs. was used per 100 parts of a hydroxy-containing monophenylsiloxane. The viscosity of the reaction mass (including solvent) prior to and after refluxing are set forth in Table VI. The process steps and manner of testing the cured elastomer have been described in detail in Example 1. The amount of reinforcing filler used is expressed in parts by weight based on 200 parts by weight of rubber stock. The filler was incorporated in

TABLE V

| | Visc. in cs. of dimethylsiloxane | Percent solids in toluene | Hrs. at reflux | Viscosity in cs.[1] | | Elastomeric Properties | | | |
|---|---|---|---|---|---|---|---|---|---|
| | | | | | | 24 hrs. at 250° C. | | 72 hrs. at 250° C. | |
| | | | | Prior to reflux | After reflux | Tensile, p.s.i. | Percent Elong. | Tensile, p.s.i. | Percent Elong. |
| 1 | 2,250 | 20 | .5 | | 5.4 | 920 | 370 | 1,100 | 180 |
| 2 | 2,250 | 40 | 1 | | 80 | 1,180 | 360 | 1,220 | 170 |
| 3 | 14,100 | 10 | 3 | 5.3 | 1.9 | 760 | 280 | 1,030 | 250 |
| 4 | 14,100 | 30 | 2 | 5.3 | 10.5 | 1,020 | 290 | 1,130 | 190 |
| 5 | 14,100 | 50 | 3 | 5.3 | 281 | 1,030 | 210 | 810 | 120 |
| 6 | 1.29×10$^6$ | 10 | 2 | 28 | 3 | | | 745 | 240 |
| 7 | 15×10$^6$ | 25 | 2 | 425 | 11 | 930 | 260 | 965 | 210 |
| 8 | 14,100 | 33.3 | 1 | 5.3 | 43.7 | 1,135 | 320 | 1,170 | 200 |
| 9 | 14,100 | 25 | 1 | 5.3 | 9.8 | 1,100 | 325 | 1,220 | 210 |
| 10 | 14,100 | 15 | 1 | 5.3 | 3.69 | 903 | 380 | 1,100 | 235 |

[1] Viscosities prior to reflux were measured at 20 percent solids in toluene. Viscosities after reflux were measured at the percent solids indicated the table.

the rubber stock during the milling operation. In each case in Table VI there was 20 percent by weight total organosiloxane solids in toluene prior to refluxing. The parts by weight of tert-butylperbenzoate per 100 parts of dimethylsiloxane are set forth in the table.

one hour at 150° C. and then for 24 hours at 250° C. This rubber was identified in Table VIII as (E).

The samples were tested by pulling each sample at a constant rate of two inches per minute until the desired stress (in p.s.i.) set forth in Table VIII was obtained.

TABLE VI

| | Pts. by wt. tert-butyl perbenzoate | Pts. by wt. filler | Reaction Conditions | | Catalyst Type | Conc. | Elastomeric Properties | | | |
|---|---|---|---|---|---|---|---|---|---|---|
| | | | Hrs. at reflux | Visc. at end of reflux (20% solids) | | | 24 hrs. at 250° C. | | 72 hrs. at 250° C. | |
| | | | | | | | Tensile, p.s.i. | Percent Elong. | Tensile, p.s.i. | Percent Elong. |
| 1 | 2 | | 1.5 | | KOH | 1 K/2,000 Si | 580 | 140 | 1,400 | 205 |
| 2 | 4 | | 1.5 | | KOH | 1 K/2,000 Si | 790 | 140 | 1,205 | 180 |
| 3 | 4 | | 1.5 | | KOH | 1 K/2,000 Si | 840 | 290 | 1,110 | 240 |
| 4 | 2 | | 1.5 | | KOH | 1 K/2,000 Si | 630 | 330 | 1,020 | 310 |
| 5 | 2 | [1] 20 | 7 | 11.52 | Tetramethyl guanidine 2-ethylhexoate. | 2% by wt. based on wt. of total siloxane solids. | 992 | 215 | 1,099 | 205 |

[1] A reinforcing silica filler formed by transforming sodium silicate in solution to a silica sol in the presence of an ion exchange resin and mixing said sol with HCl. This produces a silica having an average surface area of 250 to 500 sq. meters per gram and treating said silica to saturate its surface with trimethylsilyl attached to the silica through SiOSi bond.

*Example 7*

In this example the results obtained by varying the catalyst concentration are compared. In each case, 100 parts of a hydroxy-endblocked dimethylsiloxane with a viscosity of 14,100 cs. was used per 100 parts of a hydroxy-containing monophenylsiloxane. There was 20 percent by weight total organosiloxane solids in toluene prior to refluxing. The concentration of potassium hydroxide is set forth in Table VII. The viscosity of the reaction mass (including solvent) after refluxing is set forth in Table VII. The process steps and manner of testing the cured elastomer have been described in detail in Example 1. In each case, 2 parts by weight of tert-butylperbenzoate per 100 parts of dimethylsiloxane was used to vulcanize the siloxane block copolymer.

TABLE VII

| Conc. of catalyst | Reaction Conditions | | Elastomeric Properties | | | |
|---|---|---|---|---|---|---|
| | Hrs. at reflux | Visc. in cs. at end of reflux [1] | 24 hrs. at 250° C. | | 72 hrs. at 250° C. | |
| | | | Tensile p.s.i. | Percent Elong. | Tensile, p.s.i. | Percent Elong. |
| 1 K/500 Si | 2 | 4.8 | 975 | 300 | 1,220 | 250 |
| 1 K/1,000 Si | 3 | 4.2 | 960 | 285 | 1,125 | 185 |
| 1 K/5,000 Si | 3 | 4.2 | 935 | 345 | 1,160 | 215 |
| 1 K/10,000 Si | 3 | 4.6 | 890 | 365 | 1,100 | 235 |

[1] Viscosities were measured at 20 percent solids in toluene.

*Example 8*

The "snappy" nature and high fatigue resistance of the rubber produced in accordance with this invention is demonstrated in this example. The rubber produced in accordance with this invention has a lower energy loss (i.e., greater fatigue resistance) upon repeated extension cycles than conventional silicone rubber. These elastomers are also very snappy as demonstrated by the low energy loss during relaxation after extension.

Two of the samples prepared in the preceding examples, were compared with a conventional silicone rubber in respect to fatigue resistance and the snappy characteristics.

The conventional silicone rubber was prepared by mixing in solvent and then hot milling 60 parts by weight of a trimethylsilyl treated cogel having a surface area of at least 300 m.²/g. with 100 parts by weight of a dimethylsiloxane gum containing 0.142 mol percent vinylmethylsiloxane and 7.5 mol percent phenylmethylsiloxane. The remaining solvent was removed by heating at 150° C. for one hour. The stock was then milled while adding 0.5 part by weight of tert-butylperbenzoate. The rubber was press-molded for 10 minutes at 150° C. and heated for The stress was then released at such a rate that the sample relaxed at a constant rate of two inches per minute. This extension-relaxation cycle was then repeated for the number of pulls (n) indicated in Table VIII. On subsequent pulls the sample was extended to either same strain or stress as was obtained on the first pull. The strain obtained on each pull is set forth in the table in percent elongation. The extension energy (E) is expressed in foot-pounds/in.² of sample. This energy is determined by the area under the stress strain curve and is summed for desired levels of either stress or strain. The column "$E_1-E_n$" represents the difference between the amount of energy required to extend the sample on the first ($E_1$) and subsequent pulls ($E_n$). The subscript $n$ represents the number of pulls. The lower this difference the greater the fatigue resistance of the rubber. The relaxation energy (R) computed in foot-pounds/in.² of sample, is the amount of force recovered by releasing the sample from the extended to the relaxed state at a constant rate of two inches per minute. The energy loss during an extension-relaxation cycle ($E_n-R_n$) expresses the difference in energy required to extend the sample ($E_n$) and the amount recovered during relaxation ($R_n$) of the sample, both at a constant rate of two inches per minute. In general, the lower the energy loss during a cycle, the snappier the rubber. The percent energy lost during an extension-relaxation cycle $$\left[100\frac{(E_n-R_n)}{E_n}\right]$$

is the measure of the snappy characteristics of the rubber. In general, the lower this percent, the snappier the rubber.

As illustrated in Table VIII, the $E_1-E_n$ values for the elastomers of this invention are lower than the values for conventional silicone elastomers. This is proof of the superior fatigue resistance of the rubber of this invention. The lower energy loss and lower percent energy loss during an extension-relaxation cycle of the elastomers of this invention is proof of their superior snappy characteristics.

R. S. Marvin, E. R. Fitzgerald and J. D. Ferry, J. Applied Physics 21, 197 (1950).

TABLE VIII

| Sample No. | Pull No. (n) | Stress $T_n$, p.s.i. | Strain Percent Elong. | Extension Energy (E) ft.-lbs./in.² of sample | $E_1-E_n$ | Relaxation Energy (R) ft.-lbs./in.² of sample | Energy loss during cycle $E_n-E_n$ | Percent Energy loss during cycle $100(E_n-R_n)/E_n$ |
|---|---|---|---|---|---|---|---|---|
| E | 1 | 950 | 316 | 117.14 | 0 | 41.26 | 75.88 | 67.8 |
|   | 2 | 950 | 330 | 74.46 | 42.68 | 43.62 | 30.85 | 41.4 |
|   | 3 | 950 | 349 | 70.23 | 46.91 | 46.24 | 23.99 | 34.1 |
| 4, Table II | 1 | 692 | 123 | 24.43 | 0 | 16.60 | 7.83 | 32.0 |
|   | 2 | 655 | 123 | 19.17 | 5.26 | 16.18 | 2.99 | 15.7 |
|   | 3 | 641 | 123 | 17.76 | 6.67 | 14.68 | 3.08 | 17.3 |
| 10, Table II | 1 | 900 | 119 | 28.57 | 0 | 17.07 | 11.5 | 40.3 |
|   | 2 | 838 | 119 | 19.45 | 9.12 | 17.06 | 2.39 | 12.3 |
|   | 4 | 812 | 119 | 18.51 | 10.06 | 14.78 | 3.73 | 20.2 |

*Example 9*

The elastomers prepared in accordance with this invention are compared with conventional silicone elastomers in respect to the complex dynamic shear modulus as demonstrated in Table IX. The elastomers of this invention have properties comparable with a helical steel spring. A helical steel spring is nearly ideally elastic as determined by the fact that the stress and strain are in phase with one another. On the other hand, a perfect damper would have strain 90° out of phase with the force. Since all elastomers (both silicon and organic) are viscoelastic materials, the strain does lag behind the stress by some angle, Δ. The smaller this angle the more elastic or spring-like the material. The stress can be broken down vectorially into two components, one in phase with strain and the other 90° out of phase. Dividing each of these vector components of stress by the strain, we have the real and imaginary moduli components. This can be represented vectorially as follows:

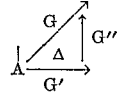

G is the complex dynamic shear modulus, G' is the real or elastic component of the complex modulus with G" being the imaginary or viscous portion of the complex modulus. The relationship between the real and imaginary modulus can be represented by either the tangent or cotangent of the angle Δ. The larger the cotangent of Δ (i.e. $G'/G''$), the greater the resilience and hence the more elastic or spring-like the material. The elastomers of this invention are extremely elastic or spring-like as represented by the large value for the cotangent of Δ. In fact, the rubbers of this invention have higher resilience than conventional silicon rubbers.

In the measurement of these properties use was made of an electronic measuring device and subsequent calculations to determine these properties. The apparatus, measurements and calculations are essentially described in two articles as follows:

(1) Measurements of Mechanical Properties of Polyisobutylene at Audiofrequencies by a Twin Transducer, (2) Dynamic Properties of Rubber, S. D. Gehman, D. E. Woodford and R. B. Stambaugh, Ind. Eng. Chem. 33, 1032 (1941).

Briefly, this apparatus comprises a metal bar suspended between two voice coils (loudspeaker units with the cores removed). One of the voice coils is driven by suitable electronic equipment which sets up a reciprocating vibration in the metal rod. This induces a voltage in the other voice coil. By suitable monitoring of the two signals and the appropriate calculations, the real modulus (G'), the imaginary modulus (G"), and the cotangent Δ of a material clamped to the central portion of the metal bar and to a stationary member of the apparatus can be determined. Experiments were conducted at various percentage of deflection or deformation of the sample, with the results varying according to the extent of the deflection. The percent deflection is the amplitude of reciprocating vibration induced in the rod divided by the thickness of the sample under test with this ratio being multiplied by 100. Comparisons between the various materials tested in Table IX can then be made of the cotangent of Δ at a given percent deflection. The higher the cotangent of Δ the more elastic the material.

The following silicone rubber was prepared:

100 parts by weight of a high molecular weight hydroxy-endblocked copolymeric siloxane composed of 99.858 mol percent dimethylsiloxane and 0.142 mol percent methylvinylsiloxane was milled with 60 parts by weight of a reinforcing silica filler, 8 parts by weight of hydroxylated dimethylsiloxane fluid having a hydroxyl content of from 3 to 4 percent by weight, and 0.5 part by weight of tert-butylperbenzoate. The rubber was then press molded for 10 minutes at 150° C. and then heated for one hour at 150° C. and for two hours at 250° C. The filler used to prepare this rubber is reinforcing silica formed by transforming sodium silicate in solution to a silica sol in the presence of an ion exchange resin, refluxing said sol with HCl to produce a silica having an average surface area of 250 to 500 square meters per gram and treating said silica to saturate its surface with dimethylsilyl units through SiOSi bonds. This sample is referred to as (F).

TABLE IX

| Sample | Percent Deflection | G' in dynes per sq. cm. | G" in dynes per sq. cm. | Cotangent Δ(G'/G") |
|---|---|---|---|---|
| 1. Sample 11, Table II | .1 | 6.13×10⁶ | 0.349×10⁶ | 17.6 |
|   | 1 | 5.88×10⁶ | 0.473×10⁶ | 17.1 |
|   | 5 | 5.75×10⁶ | 0.348×10⁶ | 16.5 |
|   | 20 | 5.45×10⁶ | 0.408×10⁶ | 13.4 |
| 2. Sample 12, Table II | 0.1 | 8.51×10⁶ | 0.561×10⁶ | 14.9 |
|   | 1.0 | 8.37×10⁶ | 0.517×10⁶ | 16.2 |
|   | 5.0 | 8.09×10⁶ | 0.492×10⁶ | 16.4 |
|   | 20.0 | 7.88×10⁶ | 0.575×10⁶ | 13.7 |
| 3. Sample 9, Table II | 0.1 | 11.7×10⁶ | 0.827×10⁶ | 14.1 |
|   | 1.0 | 11.5×10⁶ | 0.812×10⁶ | 14.2 |
|   | 5.0 | 11.3×10⁶ | 0.794×10⁶ | 14.3 |
|   | 20.0 | 10.8×10⁶ | 0.879×10⁶ | 12.3 |
| 4. F | .1 | 37.1×10⁶ | 3.19×10⁶ | 11.6 |
|   | 1 | 21.2×10⁶ | 5.67×10⁶ | 3.75 |
|   | 5 | 9.8×10⁶ | 6.24×10⁶ | 1.57 |
|   | 20 | 5.41×10⁶ | 2.16×10⁶ | 2.5 |

Example 10

This example demonstrates that different vulcanizing agents can be used to vulcanize the siloxane block copolymers of this invention. This example also demonstrates that a small amount of a low molecular weight hydroxyl-endblocked diorganosiloxane fluid can be incorporated after solvent removal with 100 parts of a hydroxy-endblocked dimethylsiloxane (14,100 cs.) and 100 parts of a hydroxy-containing monophenyl-siloxane. These samples were press vulcanized for a time and at a temperature set forth in Table X. Process steps and manner of testing the cured elastomer have been described in detail in Example 1. The low molecular weight hydroxy-endblocked diorganosiloxane fluid in each case was added after solvent removal. In each case in Table X there was 20 percent by weight total organosiloxane solids in toluene prior to refluxing. In each case 2 parts by weight of tert-butylperbenzoate per 100 parts of dimethylsiloxane was used to vulcanize the siloxane block copolymer. The following materials were used in this example:

G. A hydroxyl-endblocked dimethylsiloxane fluid having a hydroxyl content of about 3.5 percent by weight.

H. A hydroxyl-endblocked phenylmethylsiloxane fluid having a hydroxyl content of about 3.5 percent by weight.

I. A hydroxyl-endblocked siloxane copolymeric fluid having a hydroxyl content of about 3.5 percent by weight, containing about 40 mol percent phenylvinylsiloxane and 60 mol percent phenylmethylsiloxane.

TABLE X

| Parts by wt. of vulcanizing agent | Parts by wt. additive | Press Vulcanized | | Elastomeric Properties | | | |
|---|---|---|---|---|---|---|---|
| | | Time (min.) | Temp. (° C.) | 24 hrs. at 250° C. | | 72 hrs. at 250° C. | |
| | | | | Tensile, p.s.i. | Percent Elong. | Tensile, p.s.i. | Percent Elong. |
| 2 pts. tert-butylperbenzoate | 3-G | 10 | 150 | 945 | 200 | 1,170 | 130 |
| Do | 3-H | 10 | 150 | 735 | 160 | 1,020 | 140 |
| 2 pts. benzoyl peroxide | | 10 | 150 | 500 | 180 | 1,190 | 190 |
| 3 pts. benzoyl peroxide | | 5 | 125 | 936 | 200 | 1,026 | 150 |
| 2 pts. tert-butylperbenzoate and 2 pts. benzoyl peroxide | | 5 | 125 | 840 | 200 | 1,030 | 160 |
| 2 pts. tert-butylperbenzoate | 1-G | 10 | 150 | 855 | 130 | 1,005 | 160 |
| Do | 3-G and 1-I | 10 | 150 | 850 | 100 | 1,030 | 150 |

Example 11

This example demonstrates that the process used in the preceding examples can be modified by refluxing the reaction mass either without the removal of the water or with removal of the water only during the final stages of refluxing. 100 parts by weight of a hydroxy-endblocked dimethylsiloxane with a viscosity of 2,250 cs. was used per 100 parts of a hydroxy-containing monophenylsiloxane. There was 20 percent by weight total organosiloxane solids in toluene prior to refluxing. Potassium hydroxide was used in a sufficient quantity to provide one potassium atom per 2000 silicon atoms. The viscosity after refluxing of the reaction mass (including solvent) was measured. The process steps and manner of testing the cured elastomer have been described in detail in Example 1, except that in each case the reaction mass was refluxed for the time indicated in the table without removing the water. In some cases the refluxing was continued with the removal of the water as formed. In each case two parts by weight of tert-butylperbenzoate per 100 parts of dimethylsiloxane was used to vulcanize the siloxane block copolymer.

TABLE XI

| | Reaction Conditions | | Visc. in cs. after reflux | Elastomeric Properties | | | |
|---|---|---|---|---|---|---|---|
| | Hrs. reflux with H₂O retention | Hrs. reflux while azeotroping | | 24 hrs. at 250° C. | | 72 hrs. at 250° C. | |
| | | | | Tensile, p.s.i. | Percent Elong. | Tensile, p.s.i. | Percent Elong. |
| 1 | 4 | 0 | 4.1 | 1,015 | 290 | 1,010 | 205 |
| 2 | 20.5 | 0 | 4.2 | 1,020 | 410 | 1,120 | 230 |
| 3 | 20.5 | .5 | 4.5 | 1,145 | 345 | 1,170 | 205 |
| 4 | 20.5 | 2 | 4.7 | 1,090 | 370 | 1,160 | 245 |

Example 12

100 parts by weight of a hydroxy-endblocked siloxane copolymer with a viscosity of about 51,700 cs. at 25° C. which contains about 92 mol percent dimethylsiloxane, about 7.5 mol percent phenylmethylsiloxane and .5 mol percent methylvinylsiloxane, 120 parts of a hydroxy-containing monophenylsiloxane and sufficient KOH to provide 1 K/2000 Si were mixed in toluene at a siloxane solids concentration of about 25 percent by weight. The mixture was then placed in a three-necked flask equipped with an agitator and azeotrope trap. The mixture was refluxed for three hours with agitation and removal of the evolved water. The reaction mass was then carbonated with Dry Ice at room temperature and filtered. The solvent was then removed on a hot two-roll mill and two parts by weight of tert-butylperbenzoate per 100 parts of the diorganosiloxane copolymer was then added and the sample press vulcanized for 10 minutes at 150° C. and heated for one hour at 150° C. in an air circulating oven. The sample was then after-cured at 250° C. The tensile strength in pounds per square inch and the percent elongation at break was measured after 24 and 72 hours curing at this temperature. This sample had the physical properties set forth in Table XII.

TABLE XII.—ELASTOMERIC PROPERTIES

| 24 hrs. at 250° C. | | 72 hrs. at 250° C. | |
|---|---|---|---|
| Tensile, p.s.i. | Percent Elong. | Tensile, p.s.i. | Percent Elong. |
| 1,275 | 160 | 1,330 | 125 |

Example 13

100 parts of a hydroxy-enblocked dimethylsiloxane with a viscosity of about 14,100 cs. at 25° C., 100 parts by weight of $(C_6H_5Si(OH))_3$ and sufficient KOH to provide 1 K/2000 Si were mixed in 800 parts by weight toluene. The mixture was then refluxed for two hours with agitation and water removal in a three-necked flask equipped with an agitator and azeotrope trap. The reaction mass was then carbonated with Dry Ice at room temperature and filtered. The solvent was removed on a hot two-roll mill and two parts by weight tert-butylperbenzoate per 100 parts of dimethylsiloxane was added and the sample press vulcanized for 10 minutes at 150° C. and heated for one hour at 150° C. in an air circulating oven. The sample was then after-cured at 250° C. for the designated time. The tensile strength in pounds per square inch and the percent elongation at break were measured after 24 and 72 hours curing at this temperature. This sample had the physical properties set forth in Table XIII.

TABLE XIII.—ELASTOMERIC PROPERTIES

| 24 hrs. at 250° C. | | 72 hrs. at 250° C. | |
|---|---|---|---|
| Tensile, p.s.i. | Percent Elong. | Tensile, p.s.i. | Percent Elong. |
| 820 | 345 | 900 | 240 |

*Example 14*

100 parts by weight of a hydroxy-endblocked dimethylsiloxane and 100 parts of the designated hydroxyl-containing monoorganosiloxane and catalyst were mixed in toluene at a siloxane solid concentration of 20 percent by weight. The viscosity of the dimethylsiloxane and the type of monoorganosiloxane and catalyst are set forth in Table XIV. The mixture was placed in a three-neck flask equipped with agitator and azeotrope trap. The mixture was refluxed for one hour with agitation and removal of the evolved water. The reaction mass was then cooled to room temperature, carbonated with Dry Ice and filtered. The solvent was removed on a hot two-roll mill and two parts by weight of tert-butylperbenzoate added per 100 parts of dimethylsiloxane. The siloxane block copolymer was then press vulcanized for 10 minutes at 150° C. and heated in an air circulating oven for one hour at 150° C. The sample was then after cured at 250° C. for the time set forth in Table XIV. The test procedure of Example 1 was followed.

The method described above is suitable for preparing siloxane block copolymers when the diorganopolysiloxane (1) has at least 200 silicon atoms per molecule. To obtain silicone rubber stocks curable to elastomers from diorganopolysiloxanes having less than 200 silicon atoms per molecule, the following method is used.

A diorganopolysiloxane as previously described in (1) except that this siloxane can have an average of at least 110 silicon atoms per molecule instead of a minimum of 200 silicon atoms per molecule is mixed with an alkoxylated phenyl-containing silicon compound in an inert organic solvent. The organic solvent being the same organic solvents as described above. The preferred organic solvent is toluene. The mixture of the alkoxylated phenyl-containing silixone and the diorganopolysiloxane in solvent is at 15 to 40 weight percent siloxanes. The solvent solution is catalyzed with ammonium hydroxide water solution and then agitated by placing in a closed container and rotating for from 1 to 10 days at room temperature. The time required for the copolymer to form will depend upon the concentration of the ammonium hydroxide and the siloxanes used. After the proper period of time has been observed, agitation of the siloxane solution is stopped and the solvent is removed from the block copolymer by vacuum and/or by milling on a hot two-roll mill.

The above method is not difficult to use and is inexpensive. The method permits the use of diorganopolysiloxanes having an average of at least 110 silicon atoms per molecule. Also the method produces block copolymers with improved elastic properties over those made by the method previously described especially in the range from 8 to 40 parts by weight of the phenyl-containing siloxane $(C_6H_5)_xR'_ySiO_{4-x-y/2}$, per 100 parts by weight of the diorganopolysiloxane.

The diorganopolysiloxanes which are suitable in this method are those consisting of units of the formula $R_nSiO_{4-n/2}$ where R and $n$ have previously been described. The diorganopolysiloxanes must have at least two silicon-bonded hydroxyl radicals per molecule. The ratio of organ groups to silicon atoms is from 1.98/1 to 2.00/1. The diorganopolysiloxanes have at least 110 silicon atoms per molecule. The diorganopolysiloxanes which are preferred have an average of 110 to 600 silicon atoms per molecule. These diorganopolysiloxanes give the optimum results when used to make block copolymers by this method.

TABLE XIV

| | Visc. of dimethylsiloxane in cs. | Composition of Monoorganosiloxane | Catalyst | Conc. of catalyst | Elastomeric Properties | | | |
|---|---|---|---|---|---|---|---|---|
| | | | | | 24 hrs. at 250° C. | | 72 hrs. at 250° C. | |
| | | | | | Tensile, p.s.i. | Percent Elong. | Tensile, p.s.i. | Percent Elong. |
| 1 | 13,000 | Copolymer of .5 mol percent $(CH_2=CH)SiO_{1.5}$ and 99.5 mol percent $(C_6H_5)SiO_{1.5}$. | KOH | 1 K/2,000 Si | 1,225 | 330 | 925 | 151 |
| 2 | 13,000 | Copolymer of 1 mol percent $(CH_2=CH)SiO_{1.5}$ and 99 mol percent $(C_6H_5)SiO_{1.5}$. | KOH | 1 K/2,000 Si | 1,360 | 345 | 1,175 | 160 |
| 3 | 13,000 | Copolymer of 5 mol percent $(CH_2=CH)SiO_{1.5}$ and 95 mol percent $(C_6H_5)SiO_{1.5}$. | KOH | 1 K/2,000 Si | 1,375 | 195 | 1,078 | 110 |
| 4 | 13,000 | Copolymer of 1 mol percent $(CH_2=CH)SiO_{1.5}$ and 99 mol percent $(C_6H_5)SiO_{1.5}$. | Tetramethylguanidine 2-ethylhexoate. | .2% by wt. based on wt of total siloxane solids. | 1,000 | 355 | 770 | 208 |
| 5 | 14,100 | Mixture of 1 mol percent monotolylsiloxane and 99 mol percent monophenylsiloxane. | KOH | 1 K/2,000 Si | 1,205 | 328 | 1,178 | 200 |
| 6 | 14,100 | Copolymer of 10 mol percent monotolylsiloxane and 90 mol percent monophenylsiloxane. | KOH | 1 K/2,000 Si | 1,223 | 277 | 629 | 90 |
| 7 | 14,100 | Copolymer of 1 mol percent monotolylsiloxane and 99 mol percent monophenylsiloxane. | KOH | 1 K/2,000 Si | 1,093 | 279 | 718 | 121 |
| 8 | 13,000 | Copolymer of about 13 mol percent monomethylsiloxane and about 87 mol percent monophenylsiloxane. | KOH | 1 K/2,000 Si | 1,000 | 410 | 1,180 | 240 |

The alkoxylated phenyl-containing silicon compounds operable in the method are similar to those of the previously described method except that the present siloxanes are alkoxylated. The alkoxylated phenyl-containing silicon compound can be a siloxane or a silane of the formula $(C_6H_5)_xR'_y(Alk-O)_sSiO_{4-x-y-s/2}$ wherein $R'$ is a monovalent hydrocarbon as previously described, $x$ has an average value from 0.65 to 1.3, $y$ has an average value of less than 0.4, the sum of $x+y$ is from 0.95 to 1.3 inclusive, $s$ has an average value of from 0.15 to 3 inclusive, Alk— is a monovalent alkyl radical having from 1 to 5 carbon atoms per radical and the maximum value of $x+y+s$ is 4.

The alkoxylated phenyl-containing silicon compounds can be silanes or a mixture of silanes, such as phenyltrimethoxysilane, a mixture of phenyltrimethoxysilane and phenylmethyldimethoxysilane, a mixture of phenyltrimethoxysilane and ethyltrimethoxysilane, cyclohexyltriethoxysilane and vinylmethyldiethoxysilane. It is essential that 60 mol percent of all the silanes be $$C_6H_5Si(O-Alk)_3$$

and it is preferred that 80 mol percent be $$C_6H_5Si(O-Alk)_3$$

The alkoxylated phenyl-containing silicon compound can be a siloxane, a homopolymer, a copolmer or a mixture of polymers. The alkoxylated siloxanes can be any siloxane polymer composed of unit of $C_6H_5SiO_{3/2}$, $C_6H_5R'SiO$, $(C_6H_5)_2SiO$, $R'SiO_{3/2}$ and $R'_2SiO$ which has at least 0.15 alkoxy radicals per silicon atom and which has at least 60 mol percent of all the units as $C_6H_5SiO_{3/2}$ units. The alkoxylated siloxane can also contain small amounts of $SiO_2$ units.

The alkoxylated phenyl-containing silicon compound can be a mixture of a silane and a siloxane polymer such as a mixture of a phenyltrimethoxysilane and a siloxane polymer of $C_6H_5SiO_{3/2}$ which contains 0.2 methoxy radicals per silicon atom, a mixture of a phenylsiloxane and $Si(OC_2H_5)_4$, a mixture of phenyltriisopropoxysilane and a phenylsiloxane polymer or a mixture of a phenylsiloxane polymer, diethyldiethoxysilane and $Si(OC_2H_5)_4$. It is essential that all of the alkoxylated phenyl-containing silicon compounds contain at least 60 mol percent of all the silicon atoms of units which have one phenyl radical bonded to the silicon atom through a silicon-carbon bond.

The diorganopolysiloxane and the alkoxylated phenyl-containing silicon compound are mixed in a solvent at 15 to 40 percent solids. Preferably, they are mixed in toluene at 25 percent solids. To the above solution an ammonium hydroxide water solution is added. The ammonium hydroxide water solution added is a solution containing from 10 to 80 weight percent ammonium hydroxide, preferably the solution contains 20 to 70 weight percent ammonium hydroxide. The amount of ammonium hydroxide water solution added is dependent upon the concentration of the alkoxy radicals present in the alkoxylated phenyl-containing silicon compound. The ammonium hydroxide-water solution is added to the solvent solution of the silicon compounds in amounts of 0.5 to 1.5 moles of water per mole of alkoxy radical. After the ammonium hydroxide-water solution is added the mixture is put into a closed container usually containing some means for aiding agitation such as Nichrome screens. The container is then agitated, which can be readily done by placing on rollers. The mixture is agitated in this manner for 1 to 10 days depending upon the reactants used and the concentration of the ammonium hydroxide in the ammonium hydroxide-water solution. Shorter times are usually realized with lower alkoxy content materials and with higher weight percent ammonium hydroxide in the ammonium hydroxide-water solution. For optimum results in any specific system, sampling can be done at various intervals to determine if the reaction is complete or a couple test runs may be conducted.

The solvent and by-products can be removed by vacuum and/or milling on a hot two-roll mill. The method of solvent removal is not critical.

The siloxane block copolymers prepared in this manner can be cured by the peroxides as previously described such as tertiary-butyl perbenzoate and bis(2,4-dichlorobenzoyl)peroxide. The siloxane block copolymer made by this method have the added advantage in that they can be cured by catalyst such as silanol condensation catalyst, such as amine salts, such as tetramethyl guanidine dioctoate and such as carboxylic acid salts, such as dibutyl tin dilaurate. The amount of catalyst can range from 0.1 to 10 parts by weight per 100 parts of siloxane.

The following examples are illustrative only and should not be construed as limiting the invention which is properly delineated in the appended claims.

*Example 15*

A. A siloxane block copolymer was prepared by mixing the following ingredients in a gallon jug:

| | G. |
|---|---|
| Phenylsiloxane polymer composed of $C_6H_5SiO_{3/2}$ units and having 21.0 weight percent methoxy radicals | 203.6 |
| Hydroxylated essentially dimethylpolysiloxane having an average of 253 silicon atoms per molecule | 180.5 |
| Purified toluene | 1050.0 |
| Aqueous $NH_4OH$ solution having 59.1 weight percent $NH_4OH$ | 52.1 |

Nichrome screens were placed in the gallon jug. The closed jug was agitated on a roller for two days. The siloxane block copolymer was then devolatilized by milling on a hot two-roll mill. The resulting block copolymer was cured by adding one part by weight per 100 parts copolymer of tertiary butyl perbenzoate and press vulcanized for 10 minutes at 150° C.

B. A siloxane block copolymer was prepared the same as (A) except that the mixture was agitated for 7 days instead of 2 days. After curing for one hour at 150° C. and 4 hours at 250° C. the following properties were obtained.

| | Tensile, p.s.i. | Elongation, Percent |
|---|---|---|
| (A) | 1,320 | 215 |
| (B) | 1,070 | 380 |

*Example 16*

Following the procedure of Example 15, a siloxane block copolymer was prepared by mixing the ingredients in a pint bottle:

| | Grams |
|---|---|
| Methoxylated phenylsiloxane of Example 15 | 69.8 |
| Hydroxylated essentially dimethylpolysiloxane having an average of 116 silicon atoms per molecule | 33.3 |
| Purified toluene | 273.0 |
| Aqueous ammonium hydroxide solution as described in Example 15 | 17.55 |

The block copolymer was cured by adding 0.4 part by weight per 100 parts of siloxane block copolymer of tetramethyl guanidine dioctoate and press vulcanized for 10 minutes at 150° C. The block copolymer was cured by heating at 150° C. for 24 hours. The cured rubber had a tensile strength of 1200 p.s.i.

That which is claimed is:

1. A process for preparing a siloxane block copolymer which comprises (A) mixing and heating in an inert organic solvent to produce a heat-curable siloxane block copolymer
  (1) 100 parts by weight of an organopolysiloxane which has an average of at least 200 silicon atoms per molecule, said siloxane consisting essentially of units of the formula $R_nSiO_{4-n/2}$, wherein R is selected from the group consisting of methyl, phenyl and vinyl radicals, $n$ has an average value of from 1.98 to 2.00 inclusive, there being an average of at least 0.75 methyl radicals per silicon atom and an average of no more than 0.15 vinyl radical per silicon atom in said siloxane, no more than 50 mol percent of said siloxane being $(C_6H_5)_2SiO$ units, said siloxane having an average of at least 2 silicon-bonded hydroxyl radicals per molecule,
  (2) from 8 to 220 parts by weight of an organosilicon compound selected from the group consisting of
    (a) a siloxane represented by the unit formula $(C_6H_5)_xR'_ySiO_{4-x-y/2}$, wherein R' is a monovalent hydrocarbon radical, $x$ has an average value of from 0.65 to 1.3 inclusive, $y$ has an average value of less than 0.4 and the sum of $x+y$ is from 0.95 to 1.3 inclusive with at least 60 mol percent of said siloxane being $(C_6H_5)SiO_{1.5}$ units, said siloxane containing an average of at least two radicals per molecule which are selected from the group consisting of hydroxyl and —OM radicals wherein M is selected from the group consisting of alkali metal atoms and quaternary ammonium radicals,
    (b) a silanol of the general formula $(C_6H_5)_aR'_bSi(OH)_{4-a-b}$ wherein R' is a monovalent hydrocarbon radical, $a$ has an average value of from 0.65 to 1.3, $b$ has an average value of less than 0.4, and the sum of $a+b$ is from 1 to 1.3 inclusive, at least 60 mol percent of said silanol being of the formula $(C_6H_5)Si(OH)_3$,
  (3) a catalytic amount of a catalyst for the condensation of silicon-bonded hydroxyl radicals,
  the concentration of solids in the solvent being less than 50 percent by weight based on the total weight of the mixture such that no appreciable gelation occurs during the heating step,
(B) and removing the solvent from the reaction product obtained in step (A), there being sufficient agitation during this step to keep the product substantially homogeneous.

2. A process for preparing a siloxane block copolymer which comprises
(A) mixing and refluxing in an inert aromatic solvent and removing a substantial portion of the reaction by-products produced during refluxing, to produce a heat-curable siloxane block copolymer
  (1) 100 parts by weight of an organopolysiloxane which has an average of from 300 to 3500 silicon atoms per molecule, said siloxane having the unit formula $(CH_3)_nSiO_{4-n/2}$, wherein $n$ has an average value of from 1.98 to 2.00 inclusive, said siloxane having an average of 2 silicon-bonded hydroxyl radicals per molecule,
  (2) from 60 to 140 parts by weight of a siloxane of the unit formula

$x$ has an average value of from 0.9 to 1.2 inclusive, $y$ has an average value of less than 0.15, the sum of $x+y$ being from 0.95 to 1.2 inclusive, with at least 80 mol percent of said siloxane being of the unit formula $(C_6H_5)SiO_{1.5}$, said siloxane having an average of at least 2 silicon-bonded hydroxyl radicals per molecule,
  (3) a catalytic amount of an alkali metal hydroxide, the concentration of solids in the solvent being less than 50 percent by weight based on the total weight of the mixture such that no appreciable gelation occurs during the refluxing step,
(B) removing at least a substantial portion of the alkali metal hydroxide from the reaction product obtained in step (A),
(C) and removing the solvent from the reaction product by masticating the reaction product by hot milling, the temperature and time of the milling step being such as to remove substantially all of the solvent present in the reaction product and the conditions of the milling being such as to keep the product substantially homogeneous during this step.

3. Process of claim 2 wherein the aromatic solvent is toluene, $x$ has an average value of from 0.98 to 1.05 inclusive, $y$ has an average value of 0 and the alkali metal hydroxide is KOH.

4. A process for preparing a siloxane block copolymer which comprises
(A) mixing refluxing in toluene and removing the reaction by-products produced during the refluxing, to produce heat-curable siloxane block copolymer
  (1) 100 parts by weight of an organopolysiloxane which has an average of from 300 to 3,500 silicon atoms per molecule, said siloxane having the unit formula $(CH_3)_nSiO_{4-n/2}$, wherein $n$ has an average value of from 1.98 to 2.00 inclusive, said siloxane having an average of two silicon-bonded hydroxyl radicals per molecule,
  (2) from 75 to 125 parts by weight of a siloxane of the unit formula $(C_6H_5)_xSiO_{4-x/2}$, $x$ has an average value of from 0.98 to 1.05 inclusive, said siloxane having an average of at least two silicon-bonded hydroxyl radicals per molecule,
  (3) potassium hydroxide in a sufficient amount to provide one potassium atom per 100 to 100,000 silicon atoms,
  the concentration of solids in the solvent being less than 50 percent by weight based on the total weight of the mixture such that no appreciable gelation occurs during the refluxing step,
(B) adding sufficient $CO_2$ to deactivate the potassium hydroxide and then removing at least a substantial portion of the potassium carbonate formed from the reaction product obtained in step (A),
(C) and then removing the solvent from the reaction product by masticating the reaction product by hot milling, the temperature and time of the milling step being sufficient to remove substantially all of the solvent present in the reaction product and the conditions of milling being such as to keep the product substantially homogeneous during this step.

5. The process of claim 4 wherein there is one potassium atom per 500 to 10,000 silicon and the concentration of solids in toluene is between 15 and 40 percent by weight.

6. A process for preparing a siloxane block copolymer which comprises
(A) mixing and heating in an inert organic solvent to produce a heat-curable siloxane block copolymer,
  (1) 100 parts by weight of an organopolysiloxane which has an average of at least 200 silicon atoms per molecule, said siloxane consisting essentially of units of the formula $R_nSiO_{4-n/2}$, wherein R is selected from the group consisting of methyl, phenyl and vinyl radicals, $n$ has an average value of from 1.98 to 2.00 inclusive, there being an average of at least 0.75 methyl radicals per silicon atom and an average of no more than 0.15 vinyl radicals per silicon atom in said siloxane, no more than 50 mol percent of said siloxane being $(C_6H_5)_2SiO$ units, said siloxane having an average of at least 2 silicon-bonded hydroxyl radicals per molecule,
(2) from 8 to 175 parts by weight of an organo-silicon compound selected from the group consisting of
(a) a siloxane represented by the unit formula $(C_6H_5)_xR'_ySiO_{4-x-y/2}$, wherein R' is a monovalent hydrocarbon radical, $x$ has an average value of from 0.65 to 1.3 inclusive, $y$ has an average value of less than 0.4 and the sum of $x+y$ is from 0.95 to 1.3 inclusive, with at least 60 mol percent of said siloxane being $(C_6H_5)SiO_{1.5}$ units, said siloxane containing an average of at least two radicals per molecule which are selected from the group consisting of hydroxyl and —OM radicals wherein M is selected from the group consisting of alkali metal atoms and quaternary ammonium radicals,
(b) a silanol of the general formula $$(C_6H_5)_aR'_bSi(OH)_{4-a-b}$$

wherein R' is a monovalent hydrocarbon radical, $a$ has an average value of from 0.65 to 1.3, $b$ has an average value of less than 0.4, and the sum of $a+b$ is from 1 to 1.3 inclusive, at least 60 mol percent of said silanol being of the formula $$(C_6H_5)Si(OH)_3$$

(3) a catalytic amount of a silicon-bonded hydroxyl condensation catalyst,
the concentration of solids in the solvent being less than 50 percent by weight based on the total weight of the mixture such that no appreciable gelation occurs during the heating step,
(B) mixing with the reaction product of (A),
(4) an amount of a siloxane as described in (a) to make the total parts by weight of the organosilicon compound of (2) and (4) from 20 to 220,
(C) and removing the solvent from the reaction product obtained in step (B), there being sufficient agitation during this step to keep the product substantially homogeneous.

7. A heat-curable siloxane block copolymer consisting essentially of
(1) organopolysiloxane blocks of the formula $(R_nSiO_{4-n/2})_z$, wherein R is selected from the group consisting of methyl, phenyl and vinyl radicals, $n$ has an average value of from 1.98 to 2.00 inclusive, $z$ has an average value of at least 110, there being an average of at least .75 methyl radical per silicon atom and an average of no more than 0.15 vinyl radical per silicon atom in said organopolysiloxane (1), said organopolysiloxane containing no more than 50 mol percent $(C_6H_5)_2SiO$ units, and
(2) a siloxane represented by the unit formula $(C_6H_5)_xR'_ySiO_{4-x-y/2}$, wherein R' is a monovalent hydrocarbon radical, $x$ has an average value of from 0.65 to 1.3 inclusive, $y$ has an average value of less than 0.4, and the sum of $x+y$ is from 0.95 to 1.3 inclusive with at least 60 mol percent of said siloxane (2) being $(C_6H_5)SiO_{1.5}$ units,
the proportions of (1) and (2) in said block copolymer being 8 to 175 parts by weight of (2) per 100 parts by weight of (1).

8. The heat-curable siloxane block copolymer of claim 7 wherein $z$ has an average value of at least 200.

9. The siloxane block copolymer of claim 7 wherein R is methyl and R' is an aliphatic hydrocarbon radical of from 1 to 6 inclusive carbon atoms.

10. A block copolymer consisting essentially of
(1) organopolysiloxane blocks of the formula $(R_nSiO_{4-n/2})_z$, wherein R is selected from the group consisting of methyl, phenyl and vinyl radicals, $n$ has an average value of from 1.98 to 2.05 inclusive, $z$ has an average value of at least 200, there being an average of at least .75 methyl radical per silicon atom and an average of no more than .15 vinyl radical per silicon atom in said organopolysiloxane (1), said organopolysiloxane containing no more than 50 mol percent $(C_6H_5)_2SiO$ units, and
(2) a siloxane represented by the unit formula $(C_6H_5)_xR'_ySiO_{4-x-y/2}$, wherein R' is a monovalent hydrocarbon radical, $x$ has an average value of from .65 to 1.3 inclusive, $y$ has an average value of less than .4, and the sum of $x+y$ is from .95 to 1.3 inclusive with at least 60 mol percent of said siloxane (2) being $(C_6H_5)SiO_{1.5}$ units,
the proportions of (1) and (2) in said block copolymer being 100 parts by weight of (1) per 40 to 175 parts by weight of (2).

11. A heat-curable siloxane block copolymer consisting essentially of
(1) organopolysiloxane blocks of the formula $$[(CH_3)_nSiO_{4-n/2}]_z$$

wherein $n$ has an average value of from 1.98 to 2.00 inclusive, and $z$ has an average value of at least 110, and
(2) a siloxane represented by the unit formula $(C_6H_5)_x(CH_2=CH)_ySiO_{4-x-y/2}$, wherein $x$ has an average value of from 0.9 to 1.2 inclusive, $y$ has an average value of less than 0.15, the sum of $x+y$ is from 0.95 to 1.2 inclusive, with at least 60 mol percent of said siloxane (2) being of the unit formula $(C_6H_5)SiO_{1.5}$,
the proportions of (1) and (2) in said block copolymer being 20 to 175 parts by weight of (2) per 100 parts by weight of (1).

12. The heat-curable siloxane block copolymer of claim 11 wherein $z$ has an average value of at least 200.

13. The vulcanized elastomer obtained by heat-curing the siloxane block copolymer obtained in claim 11.

14. A heat-curable siloxane block copolymer consisting essentially of
(1) organopolysiloxane blocks of the formula $[(CH_3)_nSiO_{4-n/2}]_z$, wherein $n$ has an average value of from 1.98 to 2.00 inclusive and $z$ has an average value of at least 110, and
(2) a siloxane represented by the unit formula $(C_6H_5)_xSiO_{4-x/2}$, wherein $x$ has an average value of from 0.98 to 1.05 inclusive,
the proportions of (1) and (2) in said block copolymer being 60 to 140 parts by weight of (2) per 100 parts by weight of (1).

15. The heat-curable siloxane block copolymer of claim 14 wherein $z$ has an average value of at least 200.

16. The vulcanized elastomer obtained by heat-curing the siloxane block copolymer obtained in claim 14.

References Cited by the Examiner

UNITED STATES PATENTS

| | | | |
|---|---|---|---|
| 2,843,555 | 7/1958 | Berridge | 260—18 |
| 2,863,846 | 12/1958 | Tyler | 260—46.5 |
| 3,021,292 | 2/1962 | Hurd et al. | 260—3 |
| 3,032,531 | 5/1962 | Saylor | 260—46.5 |
| 3,086,954 | 4/1963 | Polmantier | 260—46.5 |
| 3,127,363 | 3/1964 | Nitzsche et al. | 260—18 |
| 3,160,601 | 12/1964 | Hyde | 260—46.5 |

FOREIGN PATENTS

| | | |
|---|---|---|
| 588,250 | 12/1959 | Canada. |
| 872,411 | 7/1961 | Great Britain. |

LEON J. BERCOVITZ, *Primary Examiner.*

DONALD S. CZAJA, *Examiner.*

F. McKELVEY, *Assistant Examiner.*